US009251400B2

(12) United States Patent  
Shiozaki et al.

(10) Patent No.: US 9,251,400 B2  
(45) Date of Patent: Feb. 2, 2016

(54) LEARNING APPARATUS, METHOD FOR CONTROLLING LEARNING APPARATUS, DETECTION APPARATUS, METHOD FOR CONTROLLING DETECTION APPARATUS AND STORAGE MEDIUM

(75) Inventors: Hiromi Shiozaki, Yokohama (JP); Masakazu Matsugu, Yokohama (JP); Yasuo Katano, Kawasaki (JP); Kan Torii, Tokyo (JP); Takayuki Iwamoto, Kawasaki (JP); Atsushi Nogami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 412 days.

(21) Appl. No.: 13/572,342

(22) Filed: Aug. 10, 2012

(65) Prior Publication Data

US 2013/0051662 A1 Feb. 28, 2013

(30) Foreign Application Priority Data

Aug. 26, 2011 (JP) ................................. 2011-185255

(51) Int. Cl.
*G06K 9/62* (2006.01)
*G06K 9/00* (2006.01)

(52) U.S. Cl.
CPC ........ *G06K 9/00228* (2013.01); *G06K 9/00362* (2013.01); *G06K 9/6292* (2013.01)

(58) Field of Classification Search
None
See application file for complete search history.

(56) References Cited

U.S. PATENT DOCUMENTS

| 7,039,233 | B2 | 5/2006 | Mori et al. |
| 7,054,850 | B2 | 5/2006 | Matsugu |
| 7,274,819 | B2 | 9/2007 | Matsugu |
| 7,577,297 | B2 | 8/2009 | Mori et al. |
| 7,783,086 | B2 * | 8/2010 | Sabe ................. G06K 9/00248 382/118 |
| 7,840,061 | B2 * | 11/2010 | Porikli ................. G06K 9/6257 382/103 |
| 7,881,524 | B2 | 2/2011 | Matsugu et al. |
| 7,912,253 | B2 | 3/2011 | Suzuki et al. |
| 7,995,805 | B2 | 8/2011 | Suzuki et al. |
| 8,130,281 | B2 | 3/2012 | Kaneda et al. |

(Continued)

FOREIGN PATENT DOCUMENTS

| JP | 2006112930 A | 4/2006 |
| JP | 4566686 B2 | 10/2010 |

OTHER PUBLICATIONS

Additive logistic regression—J. Friedman, The annals of Statistcs 2000, vol. 28, No. 2—pp. 337-407.*

(Continued)

*Primary Examiner* — Chan Park
*Assistant Examiner* — Iman K Kholdebarin
(74) *Attorney, Agent, or Firm* — Fitzpatrick, Cella, Harper & Scinto

(57) ABSTRACT

A learning apparatus comprises a plurality of detection units configured to detect a part or whole of a target object in an image and output a plurality of detection results; an estimation unit configured to estimate a state of the target object based on at least one of the plurality of detection results; a classification unit configured to classify the image into a plurality of groups based on the state of the target object; and a weight calculation unit configured to calculate weight information on each of the plurality of detection units for each of the groups based on the detection results.

11 Claims, 9 Drawing Sheets

(56) References Cited

U.S. PATENT DOCUMENTS

| | | | | |
|---|---|---|---|---|
| 8,170,276 | B2* | 5/2012 | Feris | G06K 9/6228 382/103 |
| 8,209,172 | B2 | 6/2012 | Mitarai et al. | |
| 8,224,029 | B2* | 7/2012 | Saptharishi | G06K 9/00771 382/103 |
| 8,447,139 | B2* | 5/2013 | Guan | G06K 9/00818 382/224 |
| 8,494,258 | B2* | 7/2013 | Yokono | G06K 9/00369 382/103 |
| 8,571,315 | B2* | 10/2013 | Sabe | G06K 9/4614 382/103 |
| 8,606,010 | B2* | 12/2013 | Xiao | G06K 9/6257 382/103 |
| 8,724,890 | B2* | 5/2014 | Levi | G06K 9/6231 382/103 |
| 2005/0102246 | A1* | 5/2005 | Movellan | G06K 9/00248 706/12 |
| 2006/0115157 | A1 | 6/2006 | Mori et al. | |
| 2006/0204103 | A1* | 9/2006 | Mita | G06K 9/00248 382/190 |
| 2007/0036397 | A1* | 2/2007 | Hamza | G06K 9/0061 382/117 |
| 2007/0223808 | A1* | 9/2007 | Kerr | G06K 9/6253 382/159 |
| 2007/0237387 | A1* | 10/2007 | Avidan | G06K 9/00369 382/159 |
| 2008/0219565 | A1* | 9/2008 | Hattori | G06K 9/6256 382/224 |
| 2009/0219405 | A1* | 9/2009 | Kaneda | H04N 5/232 348/222.1 |
| 2009/0324060 | A1 | 12/2009 | Sato et al. | |
| 2010/0180189 | A1 | 7/2010 | Ito et al. | |
| 2010/0290668 | A1* | 11/2010 | Friedman | G06K 9/00604 382/103 |
| 2010/0329556 | A1 | 12/2010 | Mitarai et al. | |
| 2011/0158535 | A1 | 6/2011 | Iio et al. | |
| 2012/0033853 | A1 | 2/2012 | Kaneda et al. | |
| 2012/0045120 | A1* | 2/2012 | Tate | G06K 9/6282 382/159 |
| 2012/0057791 | A1 | 3/2012 | Mitarai et al. | |
| 2012/0076417 | A1* | 3/2012 | Yoshii | G06F 17/3028 382/190 |
| 2012/0148159 | A1* | 6/2012 | Kaneda | H04N 5/232 382/190 |

OTHER PUBLICATIONS

Dalai, et al., "Histograms of Oriented Gradients for Human Detection", IEEE Computer Vision and Pattern Recognition, 2005.

Friedman, et al., "Additive Logistic Regression: a Statistical View of Boosting", The Annals of Statistics 2000, vol. 28, No. 2, 2000.

Papageorgiou, et al., "A General Framework for Object Detection", IEEE Computer Vision and Pattern Recognition, 1998.

U.S. Appl. No. 13/421,278, filed Mar. 15, 2012, Masao Yamanaka, et al.

* cited by examiner

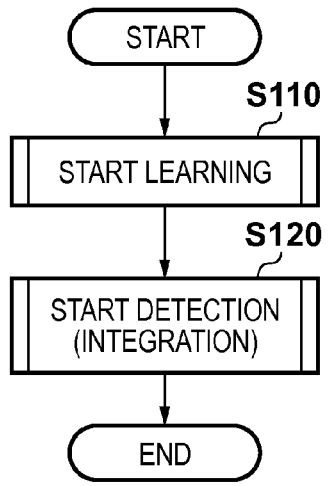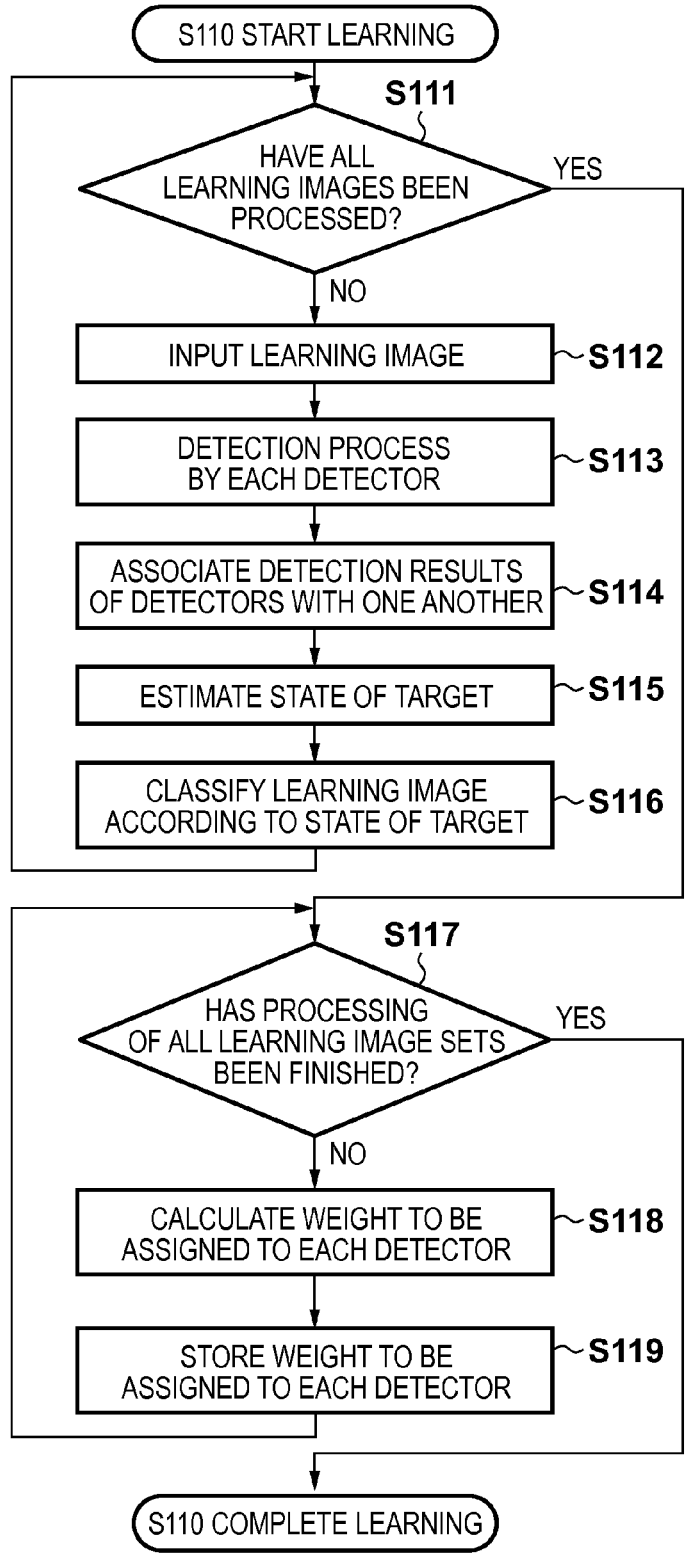

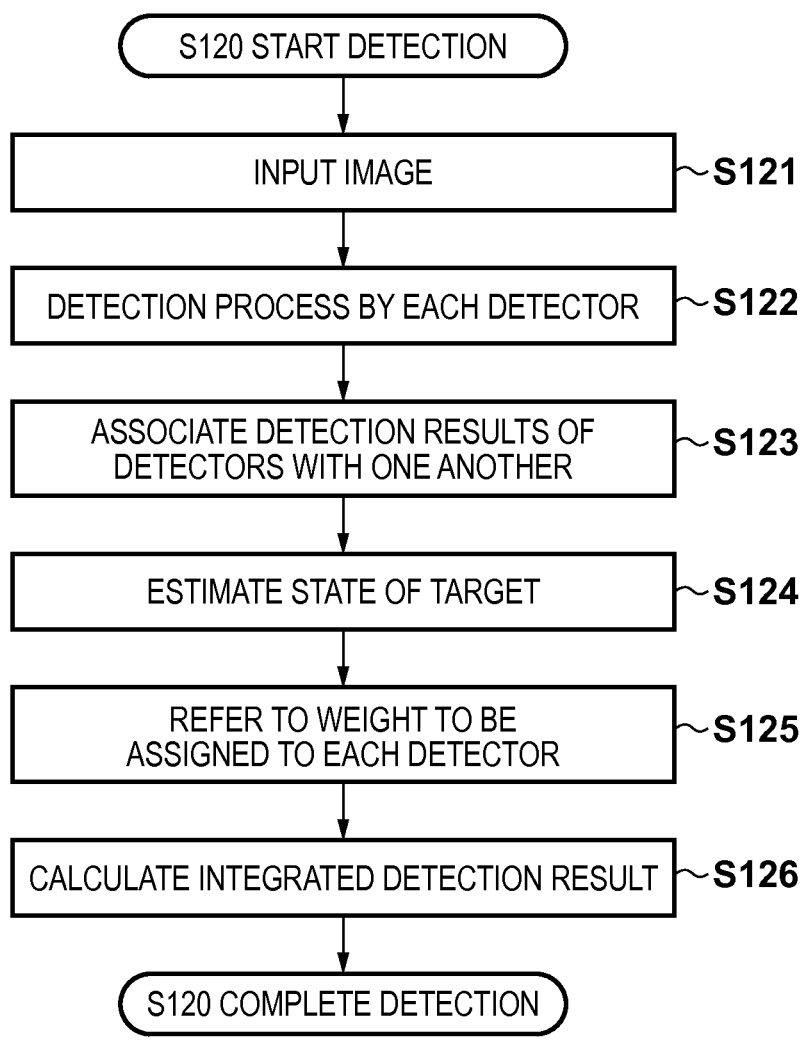

FIG. 8A

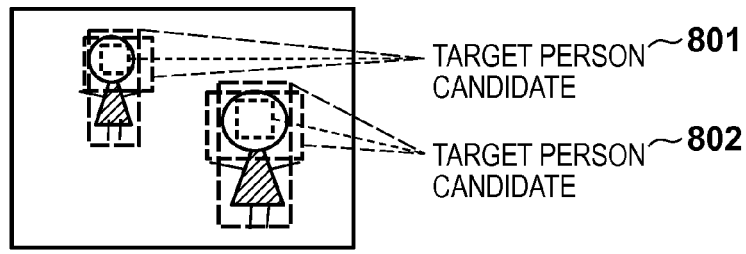

⬚ : DETECTION RESULT OF FACE DETECTOR
⬚ : DETECTION RESULT OF HEAD DETECTOR
⬚ : DETECTION RESULT OF WHOLE BODY DETECTOR

FIG. 8B

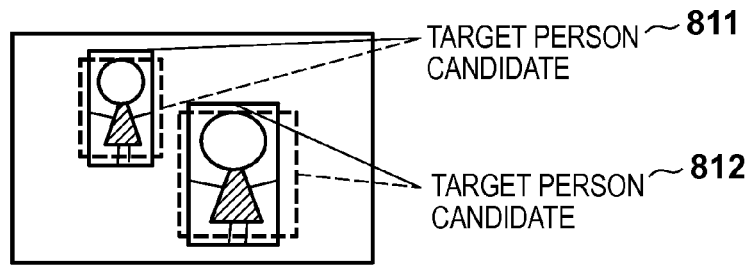

☐ : DETECTION RESULT OF STANDING POSITION/FORWARD-FACING ORIENTATION DETECTOR
⬚ : DETECTION RESULT OF SITTING POSITION/FORWARD-FACING ORIENTATION DETECTOR

FIG. 8C

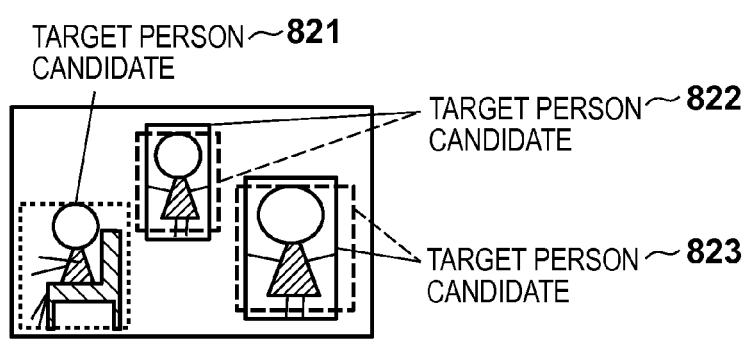

☐ : DETECTION RESULT OF STANDING POSITION/FORWARD-FACING ORIENTATION DETECTOR
⬚ : DETECTION RESULT OF SITTING POSITION/FORWARD-FACING ORIENTATION DETECTOR
⬚ : DETECTION RESULT OF SITTING POSITION/SIDEWAYS-FACING ORIENTATION DETECTOR

LEARNING APPARATUS, METHOD FOR CONTROLLING LEARNING APPARATUS, DETECTION APPARATUS, METHOD FOR CONTROLLING DETECTION APPARATUS AND STORAGE MEDIUM

BACKGROUND OF THE INVENTION

1. Field of the Invention

The present invention relates to a learning apparatus, a method for controlling the learning apparatus, a detection apparatus, a method for controlling the detection apparatus, and a storage medium, and particularly relates to a learning apparatus, a method for controlling the learning apparatus, a detection apparatus, a method for controlling the detection apparatus, and a storage medium for detecting a target object in accordance with the state of the target object using a plurality of existing detectors during the detection from images.

2. Description of the Related Art

To detect a target object in images, generally, a detector that detects the whole of the target object or a part of the target object is used. At this time, generally, a plurality of detectors are used, because use of a plurality of detectors enables detection of a target object that could not be detected with only a single detector. In cases where a plurality of detectors are used, it is necessary to integrate the outputs of the individual detectors and output the final detection result.

Japanese Patent No. 4566686 discloses a method for integrating the outputs of a plurality of detection results. In Japanese Patent No. 4566686, a method for discriminating the shape of a target object provided in an electronic component is described. Specifically, first, an image of a target object is captured, and two evaluation values for discriminating the shape of that target object are calculated. Then, a weighted sum of the evaluation values is obtained with the weights assigned to these two evaluation values changed in accordance with the shape and the size of the target object and shape discrimination conditions, and shape discrimination is performed. With this method, during shape discrimination, the weights assigned to the evaluation values are determined in accordance with the shape and the size of the target object and the preset shape discrimination conditions. This method enables discrimination suited to the shape of the target object and the shape discrimination conditions.

The shape discrimination conditions and how the weights are set under given shape discrimination conditions are important, and the manner in which the weights are set significantly influences the shape discrimination performance. However, Japanese Patent No. 4566686 makes no mention of efficient setting of the weights. If the weights are set inappropriately, it is no longer possible for the evaluation values to be weighted in a manner appropriate for the target object, and the final shape discrimination result, also, is inaccurate.

That is to say, when integrating a plurality of outputs, if it is not possible to obtain appropriate weights for the respective outputs in accordance with circumstances, it is unlikely that an effective result will be obtained even if the outputs are integrated. For this reason, it is an issue to appropriately set the weights in accordance with circumstances.

SUMMARY OF THE INVENTION

In view of the above-described issue, the present invention provides a technique for learning weights appropriate for the state of a target object to improve the target object detection performance.

According to one aspect of the present invention, there is provided a learning apparatus comprising: a plurality of detection units configured to detect a part or whole of a target object in an image and output a plurality of detection results; an estimation unit configured to estimate a state of the target object based on at least one of the plurality of detection results; a classification unit configured to classify the image into a plurality of groups based on the state of the target object; and a weight calculation unit configured to calculate weight information on each of the plurality of detection units for each of the groups based on the detection results.

According to one aspect of the present invention, there is provided a method for controlling a learning apparatus, comprising the steps of: detecting a part or whole of a target object in an image a plurality of times and outputting a plurality of detection results; estimating a state of the target object based on at least one of the plurality of detection results; classifying the image into a plurality of groups based on the state of the target object; and calculating weight information on each of the plurality of times of detection performed in the detection step for each of the groups, based on the detection results.

Further features of the present invention will be apparent from the following description of exemplary embodiments with reference to the attached drawings.

BRIEF DESCRIPTION OF THE DRAWINGS

FIGS. 2A to 2C are flowcharts illustrating the procedures of processing performed by the object detection apparatuses of the first and second embodiments.

FIGS. 8A to 8C are diagrams for explaining that detection results of a plurality of detectors are combined to provide detection target candidates in steps S114 and S123 of FIG. 2.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Overview: Detectors Are Face, Head, and Whole Body Detectors; State of Target Is Size, Cut-Off, or Occlusion An object detection apparatus of an embodiment performs a learning process for detecting a target object in images and a detection process for detecting a target object in an image. Although the detection target object will be described as a person in examples below, the detection target object is not limited to only a person. For example, the present invention is applicable to various target objects, such as animals, plants, and vehicles.

Figure 3:
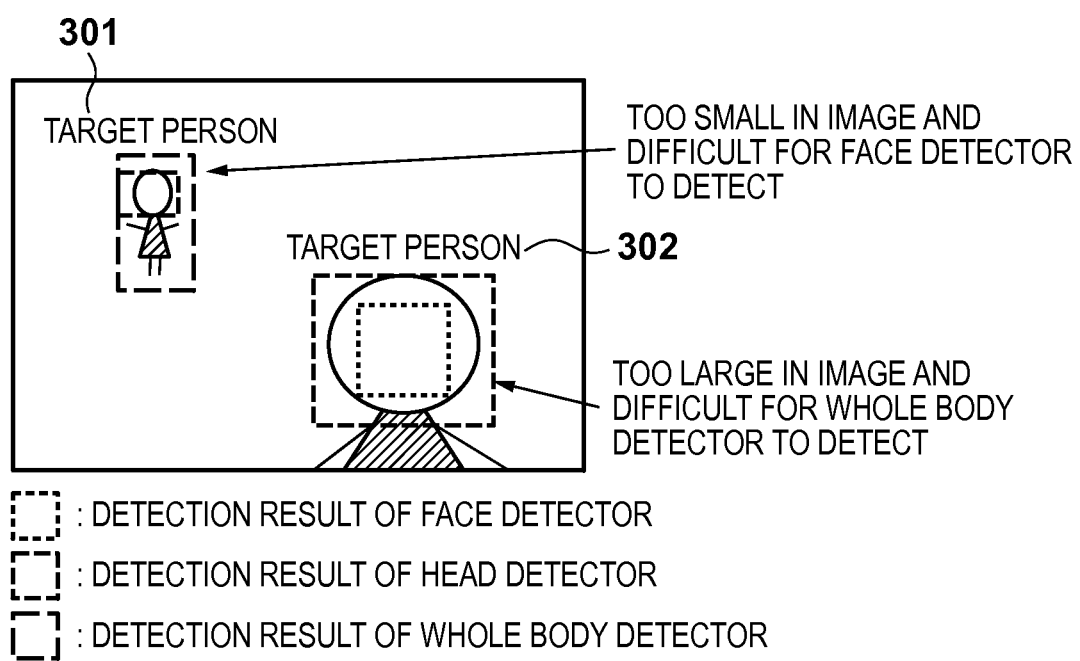
FIG. 3 is a diagram showing an example of human detection of the first embodiment.

FIG. 3 shows an example of human detection in the case where an input image contains a plurality of people, and the people appear in significantly different sizes in the image. According to the embodiment described below, in the case as shown in FIG. 3, each person can be detected using a combination of detectors suitable for respective persons. For example, in a case where a face detector, a head detector, and a whole body detector, which are existing detectors, are used, it is assumed that in an image, a target person 301 has been detected by the head detector and the whole body detector, and a target person 302 has been detected by the face detector and the head detector. In this case, it is difficult for the face detector to detect the target person 301 because the size of that person in the image is too small, and even if the person can be detected by the face detector, the reliability of the detection seems to be poor. On the other hand, the size of the target person 302 in the image is too large, so that the person is partially cut off in the image and his/her body cannot be entirely seen, and therefore it is difficult for the whole body detector to detect this person, and even if the person can be detected by the whole body detector, the reliability of the detection seems to be poor. In this manner, the reliable detector changes with the size of a target person in an image, and therefore in order to detect target objects that may be in various states, it is necessary to change the weights assigned to the detectors used to suit the state of a target object, and integrate the outputs of the detectors. That is to say, for the target person 301 in FIG. 3, the integration is performed with higher weights assigned to the head detector and the whole body detector, while for the target person 302, the integration is performed with higher weights assigned to the face detector and the head detector. This enables detection appropriate for the state of a target object.

Figure 4:
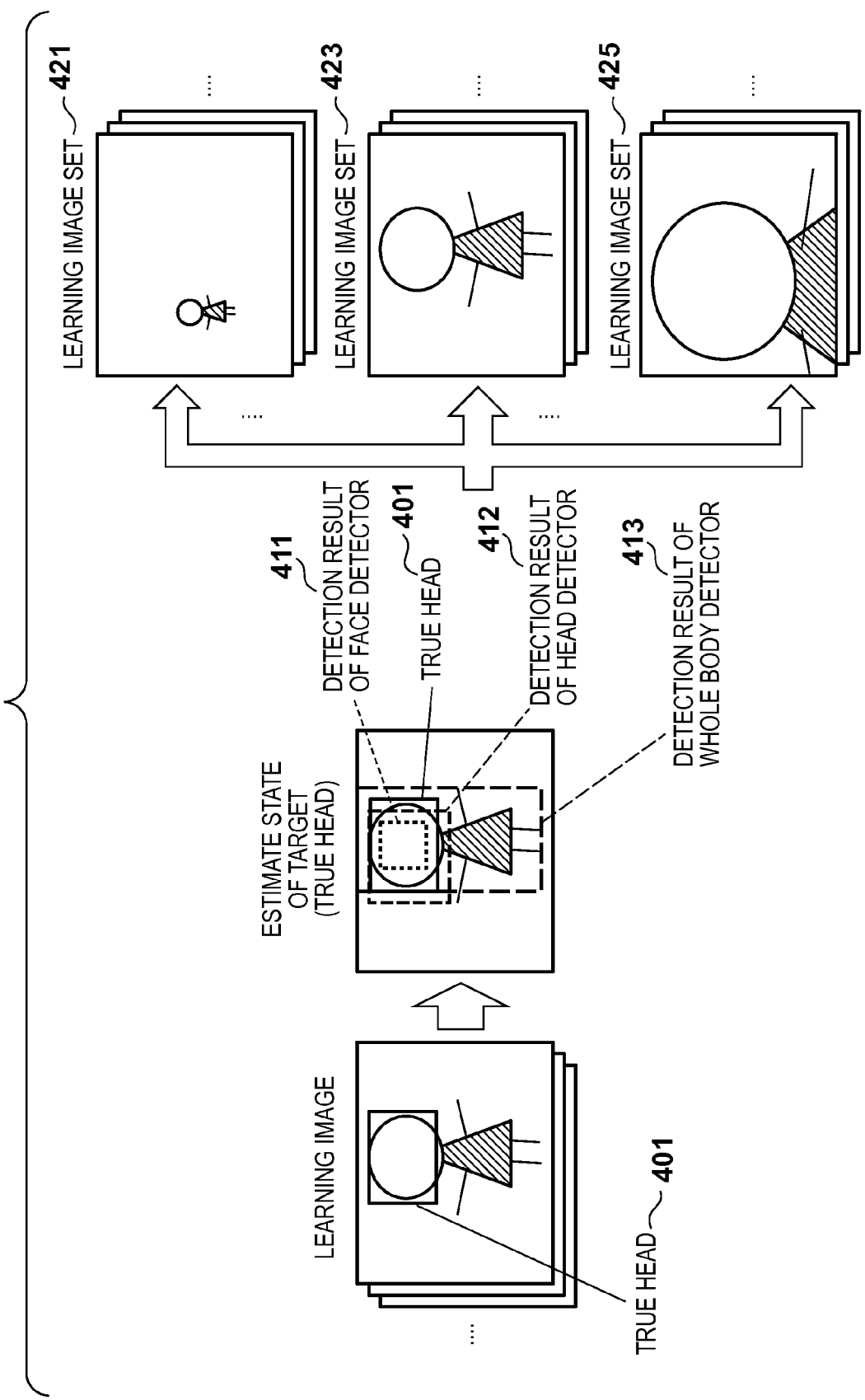
FIG. 4 is a diagram for explaining estimation of the size of the head of a target object as the state of the target object and classification of learning images based on estimation values by a target state estimation unit 1120 and a classification unit 1130 of the first embodiment.

Next, classification of learning images will be described with reference to FIG. 4. Here, it is assumed that the positions and the sizes of a person and parts of the person in an image used for learning are known. During learning, a plurality of learning images in which a person appears in a wide variety of sizes are used, and the person in the plurality of learning images input is detected using a plurality of existing detectors such as a face detector, a head detector, and a whole body detector. Then, the state of the target object, such as the size of the target object, in the images is estimated from detection results of the plurality of detectors, that is, a detection result 411 of the face detector, a detection result 412 of the head detector, and a detection result 413 of the whole body detector. In FIG. 4, the size of the head of a person is used as the size of the target object, and the size of a true head 401 is estimated. Based on the estimated size of the target object, the learning images that have been input are classified into, for example, five sets (groups), namely, learning image sets 421 to 425.

For each of the five learning image sets into which the learning images have been classified according to the size of the target object, the weights to be assigned to the plurality of detectors used, that is, the face detector, the head detector, and the whole body detector in the example shown in FIG. 4 are calculated. The method for calculating the weights will be described later.

Figure 9A:
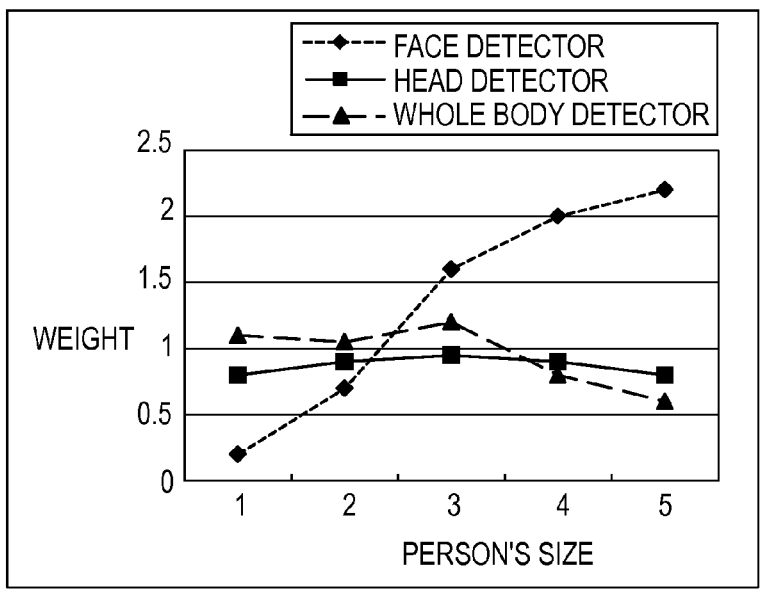
FIGS. 9A to 9C are diagrams showing examples of weights to be assigned to respective detectors calculated by a detector weight calculation unit 1140 of the first embodiment for each classification category.

FIG. 9A shows an example of the weights to be assigned to the respective detectors for each classification category of the person's size. These weights calculated for each learning image set are stored in a storage unit, which is not shown, in advance. During detection, detection is performed on a newly input image using a plurality of detectors similar to the plurality of detectors that have been used during the learning, that is, the face detector, the head detector, and the whole body detector. Then, the state of the detection target object that has been used as a criterion for classification during the learning, that is, the size of the head of a person is estimated from one or more detection results of these detectors. Then, the weights to be assigned to the plurality of detectors according to the estimated size of the head of the person, that is, the weights as shown in FIG. 9A are obtained from the storage unit. The detection results of the detectors are weighted with these obtained weights and added together, and thus a final detection result is output.

Configuration of Object Detection Apparatus

The configuration of an object detection apparatus 1000 of the present embodiment will be described with reference to FIG. 1. The object detection apparatus 1000 includes a learning apparatus 1100, a detector weight information storage unit 1200, and a detection apparatus 1300. The learning apparatus 1100 includes a detection unit 1110, a target state estimation unit 1120, a classification unit 1130, and a detector weight calculation unit 1140. The detection apparatus 1300 includes a detection unit 1310, a target state estimation unit 1320, a weight reference unit 1350, and a result output unit 1360. Those constituent elements are controlled by a CPU, which is not shown and which reads out and executes a program stored in a ROM, a RAM, or the like.

First, the learning apparatus 1100 will be described. When a learning image is input, the detection unit 1110 detects a person and a part of the person in the learning image, and outputs detection information. Detection information refers to, for example, the positions and the sizes of the detected person and part of the person and the likelihood of being a person and a part of a person. A part of a person refers to, for example, face, head, shoulders, body, and hands and feet. That is to say, a detector that detects a person as a whole is a whole body detector, and a detector that detects a part of a person includes a face detector, a head detector, a shoulder detector, a body detector, a hand and foot detector, and the like. Furthermore, it is not required that a part of a person be an explicit part. For example, a part of a person may be the upper body, and in this case, an upper body detector is used as the detector. Moreover, any detector that outputs required detection information can be used as the detector used here, and a commonly known method is used as the method used by the detector here. For example, detectors that use Haar-like features (C. P. Papageorgiou, M. Oren, and T. Poggio, A general framework for object detection, IEEE Computer Vision and Pattern Recognition, pp. 511-562, 1998) or HOG features (N. Dalal and B. Triggs, Histograms of Oriented Gradients for Human Detection, IEEE Computer Vision and Pattern Recognition, pp. 886-893, 2005) can be used. Note that although the number of detectors used in the detection unit 1110 is three, that is, a detector 1111, a detector 1112, and a detector 1113 in FIG. 1, practically, there is no limitation on the number of detectors used.

The target state estimation unit 1120 estimates the state of the target object from the detection information detected by the detection unit 1110. The state of the target object refers to, for example, the size of the target object in the image. Here, furthermore, the size of the target object is regarded as the size of the head of the target object. In order to estimate the size of the head of the target object, a detection result of one of the detectors used in the detection unit 1110 may be used, or a plurality of results may be used. The detection result of a detector refers to, for example, the detection result of the face detector, the detection result of the head detector, and the detection result of the whole body detector.

Figure 5:
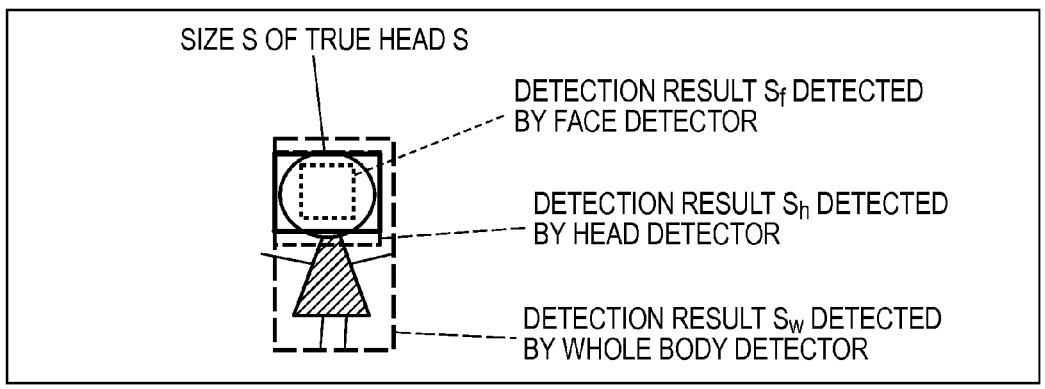
FIG. 5 is a diagram for explaining a method for estimation by the target state estimation unit 1120 and a target state estimation unit 1320 of the first embodiment in the case where the size of the head of a target object is used as the state of the target object.

Now, a method in which the target state estimation unit 1120 estimates the size of the head of the target object will be described with reference to FIG. 5. A learning image of a person with known position and size of the true head is prepared, the detectors separately perform detection on that learning image, and relative relationships between the size of the true head and the detection results of the respective detectors are learned in advance. Thus, the detection unit 1110 holds information on the size of the whole or a part of the person, so that the size of the head of the person can be estimated. Specifically, as shown in FIG. 5, with respect to a learning image with the size S of the true head previously known, a relationship between the size Sf of the face detected by the face detector and the size S of the true head is learned. Similarly, a relationship between the size S of the true head and the size Sh of the head detected by the head detector and a relationship between the size S of the true head and the size Sw of the whole body detected by the whole body detector are learned. These relationships can be obtained by, for example, a linear regression method. Thus, when an image is newly provided, the size of the head of a person can be estimated from detection results of the respective detectors. When performing this estimation, it is possible to obtain the size of the head of the person from each detector and calculate an average value or calculate a weighted average value with consideration given to the likelihood. Moreover, although the method in which the size of the head of the person is estimated from a plurality of detection results has been described here, the size of the head of the person may be estimated from only the detection result of a single detector, and, for example, a method in which an estimation value of a detector with the greatest likelihood is used is conceivable. That is to say, referring to FIG. 5, in cases where a result of only a single detector is used, the size of the head of the target object obtained from any one of the size Sf of the face of the target object detected by the face detector, the size Sh of the head of the target object detected by the head detector, and the size Sw of the whole body of the target object detected by the whole body detector is used as an estimation value. Note that although the foregoing description is based on the assumption that the state of the target object to be estimated is the size of the head of a person, the present invention is not particularly limited to this assumption.

The classification unit 1130 classifies learning images according to the state of the target object estimated by the target state estimation unit 1120. Referring to FIG. 4, which has been used in the description of the overview, specifically, the values of the size of the head of the target object estimated by the target state estimation unit 1120 are classified into five categories, and the learning images are divided into relevant learning image sets (the learning image sets 421 to 425).

Figure 1:
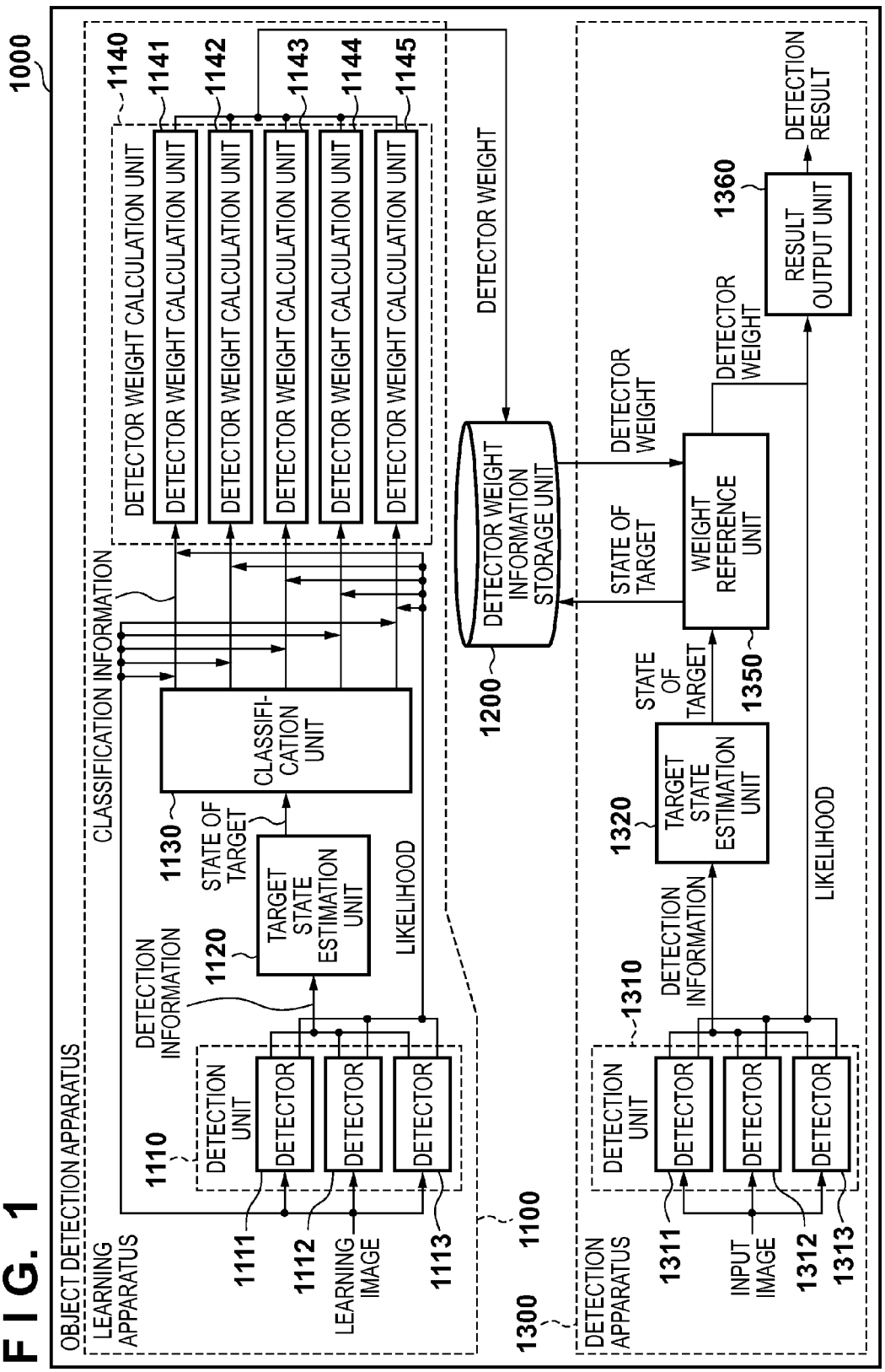
FIG. 1 is a diagram showing the configuration of object detection apparatuses of first and second embodiments.

Although the number of classification categories is set to five in FIGS. 1 and 4 for the purpose of illustration, practically, there is no limitation on the number of classification categories. Moreover, it is not necessarily required that learning images are matched in one-to-one relationships with the learning image sets, and a single learning image may belong to a single learning image set, or may be excluded from the classification categories without being classified into any learning image set.

The detector weight calculation unit 1140 calculates the weights to be assigned to the respective detectors used in the detection unit 1110, for each of the learning image sets into which learning images are classified by the classification unit 1130. Here, the detector weight calculation unit 1140 includes a detector weight calculation unit 1141, a detector weight calculation unit 1142, a detector weight calculation unit 1143, a detector weight calculation unit 1144, and a detector weight calculation unit 1145. These units respectively correspond to the learning image sets 421 to 425. Since the number of learning image sets into which learning images are classified is five, the number of detector weight calculation units is also five, but the present invention is not necessarily limited to this case.

Here, the detector weight calculation unit 1140 calculates the weights by boosting. The specific method for calculation is as described in J. Friedman, T. Hastie, and R. Tibshirani, Additive Logistic Regression: a Statistical View of Boosting, The Annals of Statistics 2000, Vol. 28, No. 2, pp. 337-407, and therefore will be described briefly here. Referring to FIGS. 1 and 4, which have been used in the description of the overview, first, attention is paid to one of the learning image sets into which learning images are classified by the classification unit 1130, for example, the learning image set 421 in FIG. 4. Using learning images contained in the learning image set 421, the detector weight calculation unit 1141 corresponding to the learning image set 421 calculates the weights to be assigned to the respective detectors when the size of the head of the target object corresponds to the learning image set 421, based on the detection results of the respective detectors. With respect to a person in the learning images contained in the learning image set 421, the position and the size of that person and the positions and the sizes of parts of that person are known. Therefore, for people in all of the learning images, determination results indicating whether or not the individual detection results detected by the plurality of detectors are correct are obtained. When the weights to be assigned to the respective detectors are calculated by boosting, each detector is used as a weak classifier, and a binary value indicating whether or not the likelihood output by the detector at this time is greater than or equal to a predetermined value is output. As also described previously, with regard to the learning images, whether or not this output is correct is known. Now, N person samples in all of the learning images are equally weighted with a weight 1/N. For all of the weak classifiers, misdetection rates weighted with the weights assigned to the person samples are calculated, and the weak classifier providing the minimum misdetection rate is selected. The weight to be assigned to the selected weak classifier is calculated from the misdetection rate at this time. Moreover, the weight assigned to a person sample that could be detected by the selected weak classifier is decreased, and the weight assigned to a person sample that could not be detected by the selected weak classifier is increased. Afterward, for the remaining weak classifiers other than the selected weak classifier, the procedure in which misdetection rates are calculated, a weak classifier is selected, the weight to be assigned to the weak classifier is calculated, and the weights assigned to the person samples are updated is repeated in the same manner as many times as the number of detectors. At this time, for example, the processing may be stopped depending on the magnitude of a misdetection rate calculated in midstream. The weights to be assigned to the weak classifiers obtained by this procedure serve as the weights to be assigned to the respective detectors.

FIG. 9A shows an example of the weights assigned to the detectors for each classification category. In FIG. 9A, the horizontal axis indicates person's size, and the vertical axis indicates the values of the weights assigned to the detectors. The detector weight calculation unit 1140 finally obtains weight information as shown in FIG. 9A. Note that the method for calculating the weights is not limited to boosting. For example, linear regression and other methods can also be used.

Next, the detector weight information storage unit 1200 will be described. The detector weight information storage unit 1200 stores the weight information calculated by the detector weight calculation unit 1140 for each of the detectors with respect to the plurality of learning image sets. At this time, as state class information on state classes to which the learning image sets belong, not only the state class numbers, but also accompanying data on the state, such as the size of the head of a person, may be stored together. Note that the detector weight information storage unit 1200 may be included in the learning apparatus although it is not included in a part of the learning apparatus in the present embodiment. Moreover, the detector weight information storage unit 1200 may be included in the detection apparatus 1300, which will be described later. Furthermore, the detector weight information storage unit 1200 may be provided as an external memory of the object detection apparatus 1000.

Subsequently, the detection apparatus 1300 that actually detects a person using the learning result of the learning apparatus 1100 will be described. The detection unit 1310 detects a person and a part of a person in a new input image using detectors similar to the detectors used in the detection unit 1110 that was used during learning, and outputs the detection information. Here, the detection unit 1310 includes a detector 1311, a detector 1312, and a detector 1313, and these detectors respectively correspond to the detector 1111, the detector 1112, and the detector 1113.

The target state estimation unit 1320 estimates the state of the detection target object from the detection information detected by the detection unit 1310. The target state estimation unit 1320 is not required to be the same as the target state estimation unit 1120 that was used during learning, but with regard to the state of the target object to be estimated, the target state estimation unit 1320 is required to estimate the same state as the target state estimation unit 1120. Moreover, a result of a single detector constituting the detection unit 1310 may be used, or results of a plurality of detectors may be used. Specific methods thereof are the same as the methods already mentioned in the description of the learning apparatus 1100, and therefore descriptions thereof will be omitted. Furthermore, the state of the target object may also be estimated by obtaining target object information using another method for obtaining information on the target object, without using a result of any detector constituting the detection unit 1310. For example, if the size of the target object is to be estimated, a distance sensor is used as a target object information obtaining unit, and a distance is obtained as the target object information. Then, the state of the target object, that is, for example, the size of the head of the target object can also be estimated based on the obtained distance. The relationship between the distance and the size of the head of the target object, which is necessary for estimation at this time, can be learned in advance using learning images.

Figure 9B:
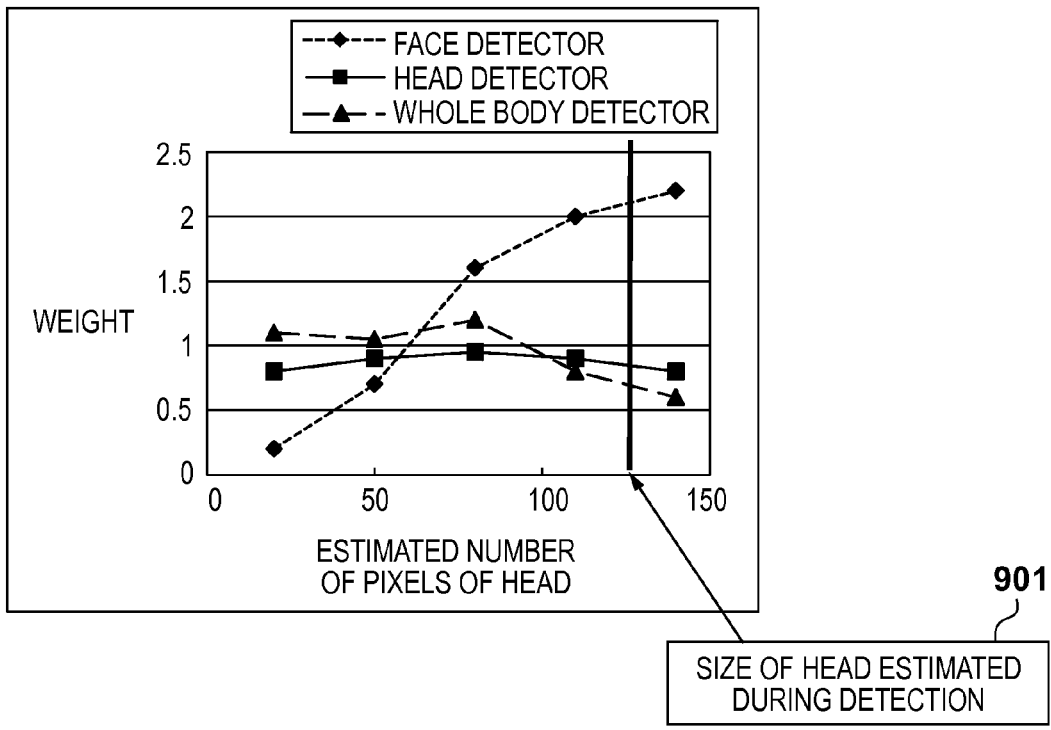

The weight reference unit 1350 compares the state of the target object estimated by the target state estimation unit 1320 with the states of the target object stored in the detector weight information storage unit 1200, and obtains weight information for the relevant state. At this time, if the states stored in the detector weight information storage unit 1200 are only the state class numbers of the learning image sets, the weights are obtained as discrete values. On the other hand, if the states stored in the detector weight information storage unit 1200 are not only the state class numbers of the state classes to which the learning image sets belong, but, for example, the values of the size of the head of a person are also stored together, values of the weights with respect to a state of the target object between the learning image sets can be interpolated. Accordingly, with respect to the state estimated by the target state estimation unit 1320, the weights can be obtained as continuous values. A case where, instead of the person's size represented by the state class numbers plotted on the horizontal axis as shown in FIG. 9A, for example, estimated numbers of pixels of the head in images are plotted on the horizontal axis as shown in FIG. 9B will be considered. It is assumed that the size indicated by number of pixels 901 in FIG. 9B is obtained by the target state estimation unit 1320 as the estimated number of pixels of the head during detection. The weights to be assigned to the respective detectors and corresponding to the point of the number of pixels 901 in FIG. 9B can be calculated by interpolation from the weights to be assigned to the respective detectors for each classification category, that is, the weights to be assigned to the respective detectors for each size of the head, which have been obtained in advance during learning. In this manner, the weights to be assigned to the respective detectors can be obtained for the values of the size of the head expressed as continuous values.

The result output unit 1360 outputs a final detection result based on the detection information from the detectors detected by the detection unit 1310 and the weights to be assigned to the respective detectors referred to by the weight reference unit 1350. The detection information refers to, for example, the likelihood of being a person or a part of a person. The likelihoods detected by the respective detectors are weighted and added together to calculate a detection result. Although there is no particular limitation on the manner in which the detection result is output, for example, the calculated value may be directly output. Also, it is possible to determine whether or not the target object is a person by comparing the calculated value with a threshold and output the determination result as a binary value.

Although the foregoing description is based on the assumption that the state of the target object is the size of a person, more specifically, the size of the head of a person, practically, the state of the target object is not limited only to the size of a person and may be other states. For example, the state of the target object may be an extent to which the target object is partially cut off in an image. The extent to which the target object is partially cut off means the extent to which a person or a part of a person in an image does not entirely fit within the image and is partially missing. If the extent to which the target object is partially cut off in an image is used as the state of the target object, based on the position of the whole or a part of the detection target person detected by the detection unit 1110 and the detection unit 1310 and, furthermore, the width and the height of the image, how much and which part of the person is partially cut off in the image can be estimated.

Figure 6:
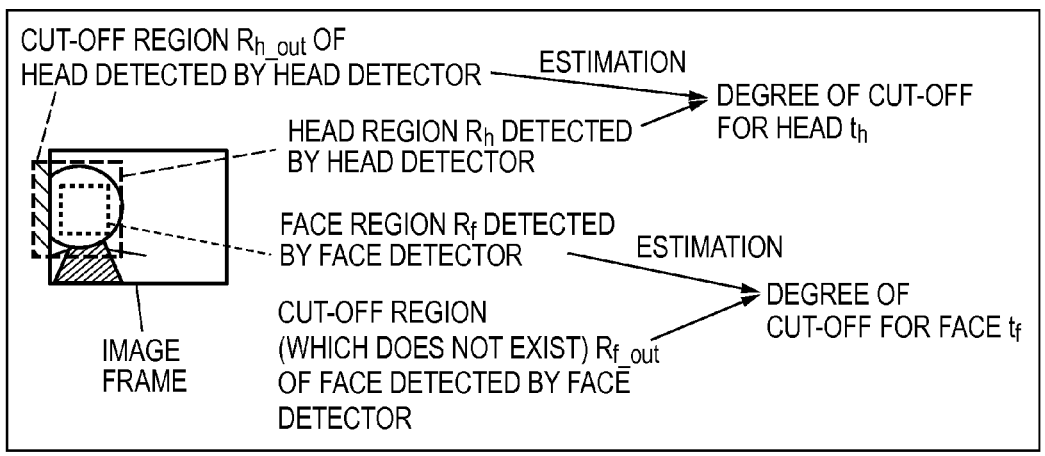
FIG. 6 is a diagram for explaining a method for estimation by the target state estimation unit 1120 and the target state estimation unit 1320 of the first embodiment in the case where the degree to which a target object is partially cut off in images is used as the state of the target object.

A method for obtaining the extent to which the target object is partially cut off in an image will be described with reference to FIG. 6. The degree of cut-off for head th is obtained by calculating the ratio between a head region Rh detected by the head detector and a region Rh_out of the head region Rh that extends outside an image frame. Similarly, the degree of cut-off for face tf is obtained by calculating the ratio between a face region Rf detected by the face detector and a region Rf_out of the face region Rf that extends outside the image frame. The extent to which each part of the target object is partially cut off can be estimated using the degree of cut-off. Note that although only the cut-off of the face and the head has been described as an example, the extent to which parts such as the upper body and the whole body are partially cut off can also be obtained in the same manner. The classification unit 1130 in FIG. 1, for example, classifies learning images into M learning image sets using the degree of cut-off for a human body as a whole or the degree of cut-off for each part of a person as the state classes, and the detector weight calculation unit 1140 can calculate the weights to be assigned to the detectors for each of the learning image sets into which the learning images are classified, by a method such as boosting described above. Specifically, classification categories including an image set of images in which no whole body is cut off, an image set of images in which only hands or feet are partially cut off and neither face nor head is cut off, and an image set of images in which only faces are not cut off are conceivable as the learning image sets into which learning images are classified according to the extent of cut-off.

Furthermore, the extent of occlusion may also be used as the state of the target object. In the case where the extent of occlusion is used as the state of the target object, based on the likelihood of being the whole or a part of a person, which has been detected by the detection unit 1110 and the detection unit 1310, which part of the person is occluded can be estimated.

Figure 7:
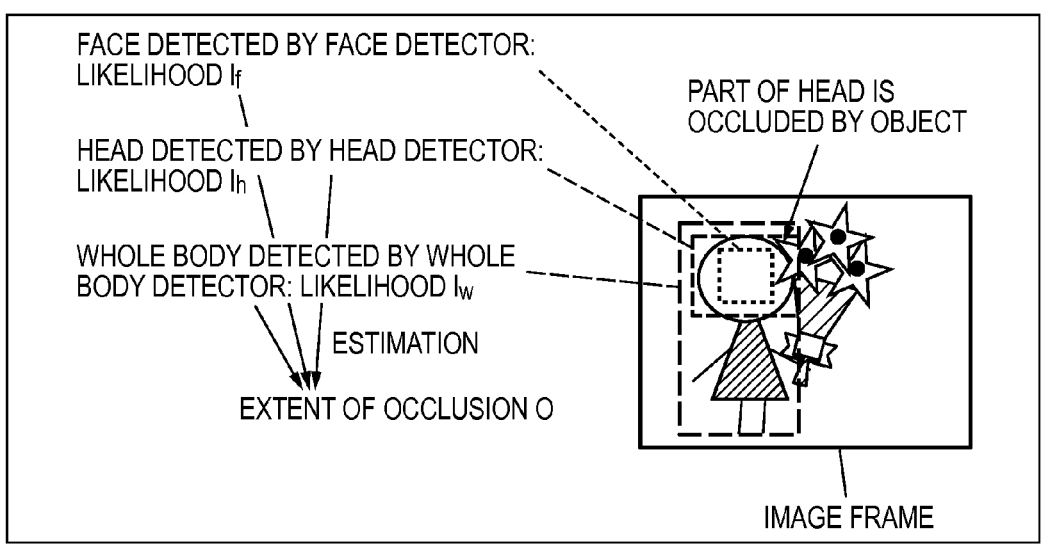
FIG. 7 is a diagram for explaining a method for estimation by the target state estimation unit 1120 and the target state estimation unit 1320 of the first embodiment in the case where the degree to which a target object is occluded in images is used as the state of the target object.

A method for obtaining the extent to which the target object is occluded will be described with reference to FIG. 7. It is assumed that the likelihood lf for face detected by the face detector, the likelihood lh for head detected by the head detector, and the likelihood lw for whole body detected by the whole body detector have been obtained. When the likelihoods in FIG. 7 are compared with the likelihoods in a situation in which there is no occlusion, the value of likelihood detected by the head detector for the head, which is partially occluded, is clearly low, and the likelihood for the whole body, which also is slightly occluded, is slightly low. The degree of occlusion "o" of the target object can be estimated by comparing the likelihood in a situation in which there is no occlusion with the likelihood in a situation in which there is occlusion. Although an example regarding occlusions of the face, the head, and the whole body has been described here, the extent of occlusion for the hands, the feet, the upper body, and the like can also be obtained in the same manner. The classification unit 1130 in FIG. 1, for example, classifies learning images into M learning image sets using the extent of occlusion of a human body as a whole or the extent of occlusion of each part as the state classes, and the detector weight calculation unit 1140 can calculate the weights to be assigned to the detectors by the above-described method for each of the learning image sets into which the learning images are classified. Examples of the learning image sets into which learning images are classified according to the extent of occlusion include the following image sets: an image set of images with occlusions of faces including a case where a person faces rearward and a case where a person wears sunglasses, an image set of images in which only the feet are occluded by a desk or the like, and an image set of images in which there is no occlusion.

As described above, the classification unit 1130 classifies learning images into learning image sets according to the estimated state of the target object, and the detector weight calculation unit 1140 calculates the weights. The present invention is applicable to cases where various types of the state of the target object are employed.

Processing Procedure

Subsequently, the procedures of processing by the object detection apparatus 1000 of the present embodiment will be described with reference to flowcharts of FIGS. 2A to 2C. Note that programs in accordance with the respective flowcharts are stored in a memory, which is not shown, such as a RAM or a ROM within the object detection apparatus 1000 and read out and executed by a CPU, which is not shown.

Here, the learning process and the detection process will be described continuously, but it is not necessary that the learning process and the detection process be executed continuously, and once the learning process has been performed, only the detection process can be performed any number of times at any timings.

In FIG. 2A, first, in step S110, when learning images are prepared, the learning apparatus 1100 performs the learning process. Next, in step S120, the detection apparatus 1300 performs the detection process for detecting a target object in an input image.

Details of the learning process in step S110 in FIG. 2A will be described with reference to the flowchart of FIG. 2B.

In step S111, the learning apparatus 1100 determines whether or not all of the prepared learning images have been processed. If it is determined that all of the learning images have been processed (step S111; YES), the process proceeds to step S117. On the other hand, if it is determined that not all of the learning images have been processed (step S111; NO), the process proceeds to step S112.

In step S112, the learning apparatus 1100 inputs one of the prepared learning images.

In step S113, the detection unit 1110 detects a person and a part of a person in the learning image input in step S112, using a plurality of detectors. Here, in the following description, it is assumed that the plurality of detectors are a face detector, a head detector, and a whole body detector. However, the detectors used are not limited to these detectors.

In step S114, the detection unit 1110 associates detection results of the plurality of detectors with one another. Associating the detection results with one another herein means linking the detection positions of the detectors into mutual relationships with one another, and the association can be performed by previously learning the relationships between detection positions in the case where all of the detectors have detected the target object properly. For example, it is assumed that the plurality of detectors are the three detectors, that is, the face detector, the head detector, and the whole body detector. Temporarily, a case where two outputs of the face detector, two outputs of the head detector, and two outputs of the whole body detector are obtained in an image as shown in FIG. 8A will be considered. A target person candidate 801 and a target person candidate 802 can be obtained by associating three outputs, one each of the face detector, the head detector, and the whole body detector, with one another. The association is completed by obtaining the target person candidates from the detection results, and the positions of the associated target person candidates in the image and the position and the likelihood of each detector are transmitted to the target state estimation unit 1120.

In step S115, the target state estimation unit 1120 estimates the state of the target object, for example, the size of the head. Note that although the size of the head of the target object is used here, the state of the target object is not limited to the size of the head. The size of the head obtained by the target state estimation unit 1120 is transmitted to the classification unit 1130.

In step S116, the classification unit 1130 classifies the learning image based on the size of the head estimated in step S115. Then, the process returns to step S111.

In step S117, the detector weight calculation unit 1140 determines whether or not processing for calculating the weights to be assigned to the respective detectors has been finished for all of the learning image sets into which the learning images are classified by the classification unit 1130. If it is determined that the processing has been finished for all of the learning image sets (step S117; YES), the process is ended. On the other hand, if it is determined that the processing has not been finished for all of the learning image sets (step S117; NO), the process proceeds to step S118.

In step S118, the detector weight calculation unit 1140 calculates the weights to be respectively assigned to the plurality of detectors used in the detection unit 1110, with respect to one of the learning image sets into which the learning images are classified by the classification unit 1130. Methods such as the above-described boosting learning, linear regression, and the like can be used for the processing for calculating the weights.

In step S119, the detector weight calculation unit 1140 stores the calculated weights to be respectively assigned to the plurality of detectors and class information on the learning image set corresponding to those weights in the detector weight information storage unit 1200. The class information refers to the state class numbers of the learning image sets as already described above, average values of the classified values of the size of the head of the target object, and the like. Afterward, the process returns to step S117.

Thus, the learning process is ended.

Next, details of the detection process in step S120 in FIG. 2A will be described with reference to the flowchart of FIG. 2C.

In step S121, the detection apparatus 1300 inputs an image, which is the target of the detection process.

In step S122, the detection unit 1310 detects a person and a part of a person in the image that has been input in step S121, using a plurality of detectors that are the same as those used during learning.

In step S123, the detection unit 1310 associates detection results of the plurality of detectors with one another in the same manner as in learning. When the association of the detection results is completed, the associated detection results are transmitted to the target state estimation unit 1320.

In step S124, the target state estimation unit 1320 estimates the state of the target object. It is required that data necessary for the estimation of the state class of the target object here be the same as the data used in the classification of the state by the target state estimation unit 1120. That is to say, in the case of the example described above, it is required to use the size of the head. However, the method for estimation here may be different from that of the target state estimation unit 1120. The size of the head obtained by the target state estimation unit 1320 is transmitted to the weight reference unit 1350.

In step S125, based on the size of the head of the target object obtained by the target state estimation unit 1320, the weight reference unit 1350 obtains the weights to be assigned to the respective detectors with respect to the state class number of the corresponding learning image set from the detector weight information storage unit 1200. Alternatively, the weight reference unit 1350 obtains the weights to be assigned to the respective detectors with respect to the size of the head of the target object from information on accompanying data such as an average value of the images contained in the learning image set by interpolation. The weight information on each of the detectors obtained by the weight reference unit 1350 is transmitted to the result output unit 1360.

In step S126, the result output unit 1360 calculates a final detection result from the detection results of the respective detectors detected by the detection unit 1310 and the weight information on each of the detectors obtained in step S125. The results of the respective detectors refer to, for example, the likelihoods of being a person or a part of a person. For example, assuming that the face detector, the head detector, and the whole body detector are used in the detection unit 1310, the likelihood of the face detector is expressed as $\rho\_f$, the likelihood of the head detector is expressed as $\rho\_h$, and the likelihood of the whole body detector is expressed as $\rho\_w$. When the weight to be assigned to the face detector is $w\_f$, the weight to be assigned to the head detector is $w\_h$, and the weight to be assigned to the whole body detector is $w\_w$, the weights being obtained from the detector weight information storage unit 1200 based on the size of the head of the target object, the final detection result "f" can be obtained as the sum of the products of the likelihoods and the weights by an equation (1) below:

$$f = \rho\_f * w\_f + \rho\_h * w\_h + \rho\_w * w\_w \quad (1)$$

It is possible to determine whether or not, for example, the target object is a particular person by determining whether or not the value of the final detection result "f" is greater than or equal to a threshold.

Thus, the detection process is ended. As described above, according to the present embodiment, the target object detection performance can be improved by learning weights suited to the state of the target object.

Second Embodiment

Figure 9C:
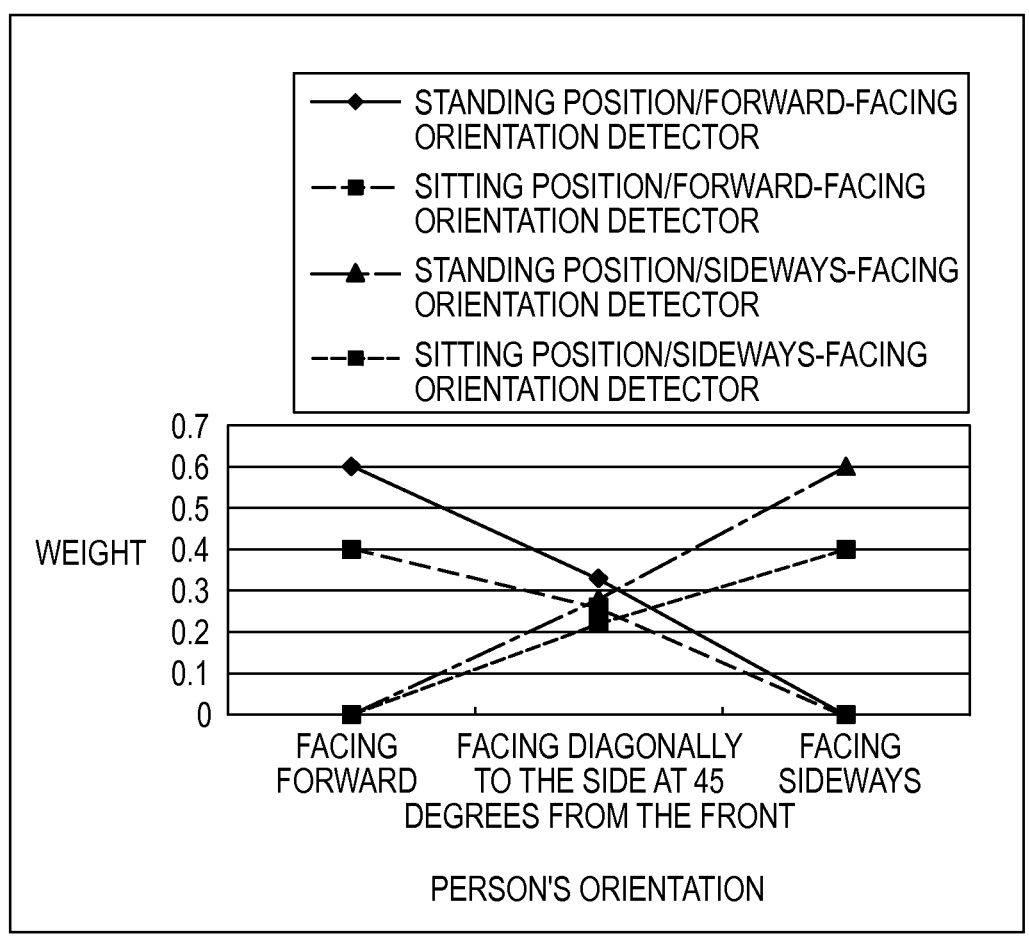

An object detection apparatus having the same configuration as the object detection apparatus 1000 described in the first embodiment is used as an object detection apparatus of the present embodiment. However, the detectors used and the state to be estimated differ from those of the first embodiment. That is to say, the present embodiment is different from the first embodiment in that the detectors used detect the whole bodies of people in different poses rather than detecting a part of a person and that the state to be estimated is orientations of the people. Unlike the first embodiment, target objects to be detected by the detectors basically adopt mutually sufficiently different poses, and the target objects adopting different poses are detected by the detectors, from which orientations of the target objects are estimated, and weighted integration is performed with respect to each detector. FIG. 9C shows an example of the weights to be assigned to the respective detectors for each orientation, and the detection results of the detectors for each pose are integrated using the weights as shown in FIG. 9C.

Configuration of Object Detection Apparatus

The differences between the configuration of the object detection apparatus of the present embodiment and that of the object detection apparatus 1000 of the first embodiment are the processing details of the detection unit 1110 and the target state estimation unit 1120 included in the learning apparatus 1100 and the processing details of the detection unit 1310 and the target state estimation unit 1320 included in the detection apparatus 1300.

First, the learning apparatus 1100 will be described. When a learning image is input, the detectors of the detection unit 1110 detect people adopting various poses in the learning image and output the detection information. The detection information refers to, for example, the positions and the sizes of the people in the image, the orientations of the people, and the likelihood of being people adopting particular poses. Here, the particular poses include, for example, pose classes such as a standing position, a sitting position, and a lying position and also information regarding orientation classes such as a forward-facing orientation, a sideways-facing orientation, and a rearward-facing orientation. That is to say, examples of the detectors used here include a standing position/forward-facing orientation detector, a sitting position/forward-facing orientation detector, a standing position/sideways-facing orientation detector, and a sitting position/sideways-facing orientation detector. Moreover, any detector that outputs the required detection information can be used as the detectors used here. Here, well-known detectors that use Haar-like features, HOG features, or the like, which also have been mentioned as examples in the first embodiment, are used. Furthermore, although it is assumed that a plurality of detectors are used in the detection unit 1310, there is no limitation on a specific number of detectors.

The target state estimation unit 1120 estimates the state of the detection target object from the detection information detected by the detection unit 1110. The state of the target object refers to, for example, the orientation of a person. Specifically, the state of the target object includes a forward-facing orientation, a rearward-facing orientation, and a sideways-facing orientation and may further include intermediate orientations such as a diagonal orientation at an angle of 45 degrees.

The estimation of the orientation of the target object can be realized by, for example, a method as described below. A learning image of a person with the true orientation of the target object being known is prepared, and the detection process is performed on that image by the detectors. Then, the detection result of each detector, that is, which detector has detected the person and a relationship with the true orientation of the target object are learned in advance. Thus, the detector of the detection unit 1110 that has detected the person is known, so that the orientation of the person can be estimated. At this time, the orientation may be estimated from the detection result of only a single detector used in the detection unit 1110, or may be estimated from detection results of a plurality of detectors. If the orientation is estimated from detection results of a plurality of detectors, methods that use an average value of the orientation of the person estimated by the plurality of detectors, a weighted average with consideration given to the likelihood, an estimation value of a detector providing the greatest likelihood, or the like are conceivable.

The classification unit 1130, the detector weight calculation unit 1140, and the detector weight information storage unit 1200 are the same as those of the first embodiment, and therefore descriptions thereof will be omitted.

Next, the detection apparatus 1300 will be described. The detection unit 1310 detects a person adopting a certain pose in a new input image using detectors similar to the detectors used in the detection unit 1110 during learning, and outputs the detection information.

The target state estimation unit 1320 estimates the state of the detection target object from the detection information detected by the detection unit 1310. It is not necessary that the target state estimation unit 1320 be the same as the target state estimation unit 1120 used in learning, but it is necessary that the state of the target object to be estimated be the same as that of the target state estimation unit 1120, that is, in the example described above, it is necessary that the orientation of the target object be estimated as the state of the target object. Moreover, a detection result of a single detector included in the detection unit 1310 may be used, or a plurality of detection results of a plurality of detectors may be used. Furthermore, it is also possible to estimate the orientation of the target object using another method for obtaining information on the target object without using a detection result of any detector in the detection unit 1310. For example, in cases where a moving image is used, it is possible to estimate the orientation of a person from the direction of movement of the target object using a motion detector.

The weight reference unit 1350 and the result output unit 1360 do not differ from those of the first embodiment, and descriptions thereof will be omitted.

Processing Procedure

Processing performed by the object detection apparatus of the present embodiment will be described with reference to the flowcharts of FIGS. 2A to 2C, which have been used in the description of the first embodiment. Since only some steps are different from those of the first embodiment and otherwise the processing of the present embodiment is the same as that of the first embodiment, detailed descriptions of the common processing will be omitted.

Here, a learning process and a detection process will be described continuously, but it is not necessary to execute the learning process and the detection process continuously, and once the learning process has been performed, only the detection process can be performed any number of times at any timings.

With regard to the flowchart of FIG. 2A, the procedure is the same as that of the first embodiment, and so with regard the flowchart of FIG. 2B, differences from the first embodiment will be described.

The processing in steps S111 and S112 is the same as in the first embodiment. In step S113, each of a plurality of pose detectors of the detection unit 1110 detects a person adopting a certain pose in the learning image input in step S112.

In step S114, the detection unit 1110 associates the detection results detected by the plurality of pose detectors with one another. Associating the detection results with one another here means mutual relationships of detection positions of the detectors, which can be obtained by previously learning the relationships between the detection positions in the case where the detection results of all of the detectors are appropriate for the target object. For example, it is assumed that the plurality of detectors are a standing position/forward-facing orientation detector and a sitting position/forward-facing orientation detector. If two outputs of the standing position/forward-facing orientation detector and two outputs of the sitting position/forward-facing orientation detector are obtained in an image as shown in FIG. 8B, a target person candidate 811 and a target person candidate 812 can be obtained by associating the outputs of the standing position/forward-facing orientation detector with the corresponding outputs of the sitting position/forward-facing orientation detector. Here, since the detectors used are basically detectors for mutually different poses, some methods for association are conceivable. For example, as shown in FIG. 8B, a method that focuses on only the position and the size of the detection results and associates the detection results of all of the detectors used with one another is conceivable. In addition, there also is a method that selectively associates the detection results in such a manner that only the detection results of detectors for poses having similar appearances are associated with each other, and the detection results of detectors for poses having different appearances with the difference being greater than or equal to a certain threshold are not associated with each other. For example, as shown in FIG. 8C, it is assumed that two outputs from a standing position/forward-facing orientation detector, two outputs from a sitting position/forward-facing orientation detector, and one output from a sitting position/sideways-facing orientation detector have been obtained in an image.

The detection result of the sitting position/sideways-facing orientation detector is not associated with the outputs of the other detectors, and a target person candidate 821 is obtained. Then, only the outputs of the standing position/forward-facing orientation detector and the corresponding outputs of the sitting position/forward-facing orientation detector are associated with each other, so that a target person candidate 822 and a target person candidate 823 are obtained. Here, the detectors to be associated are uniquely determined by hand, but the detectors to be associated may be automatically determined based on some kind of features. In this manner, the target person candidates are obtained from the detection results, and thus the association is completed. The positions of the associated target person candidates and the positions and the likelihoods of the detectors are transmitted to the target state estimation unit 1120.

In step S117, with respect to all of the learning image sets into which the learning images are classified by the classification unit 1130, the detector weight calculation unit 1140 determines whether or not the processing for calculating the weights to be assigned to the respective detectors has been finished. The learning image sets into which learning images are classified here refer to, for example, an image set of images in which a person faces forward, an image set of images in which a person faces diagonally to the side at an angle of 45 degrees from the front, an image set of images in which a person faces sideways, an image set of images in which a person faces diagonally to the back at an angle of 45 degrees from the side, an image set of images in which a person faces rearward, and the like. If it is determined that the processing for all of the learning image sets has been finished (step S117; YES), the process is ended. On the other hand, if it is determined that the processing has not been finished for all of the learning image sets (step S117; NO), the process proceeds to step S118.

The processing in steps S118 and S119 is the same as in the first embodiment. Then, the process is ended.

Next, with regard to the flowchart of FIG. 2C, differences from the first embodiment will be described. The processing in step S121 is the same as in the first embodiment. In step S122, the detection unit 1310 detects people adopting various poses in the image input in step S121, using a plurality of pose detectors that are the same as those used for learning.

In step S123, the detection unit 1310 associates the detection results of the plurality of pose detectors with one another in the same manner as in learning. When association of the detection results is completed, the associated detection results are transmitted to the target state estimation unit 1320.

The processing in steps S124 and S125 are the same as in the first embodiment. In step S126, the result output unit 1360 calculates a final detection result from the detection results of the respective detectors detected by the detection unit 1310 and the weights to be assigned to the respective detectors obtained in step S125. The results of the detectors refer to the likelihoods of being a person adopting a certain pose. Then, the process is ended.

Thus, the detection process is ended. As described above, according to the present embodiment, the target object detection performance can be improved by learning weights suited to the state of the target object.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185255 filed on Aug. 26, 2011, which is hereby incorporated by reference herein in its entirety.

What is claimed is:

1. A learning apparatus comprising:
   a plurality of detection units configured to detect a part or whole of a target object from a plurality of learning images in each of which an actual state of the target object is known;
   an estimation unit configured to estimate a state of the target object detected by the plurality of detection units;
   a classification unit configured to classify the learning images into a plurality of state classes based on the estimated state of the target object; and
   a calculation unit configured to calculate an error rate of the estimated state of the target object for each of the state classes with respect to each of the plurality of detection units based on the actual state of the target object;
   a weight determination unit configured to determine a weight with respect to each of the plurality of detection units for each of the state classes based on the calculated error rate; and
   a storage unit configured to store respective weights for the plurality of detection units in association with the state classes of the target object.

2. The learning apparatus according to claim 1, wherein detection results of the target object by the plurality of detection units are a position and a size of the target object in the image and likelihood of the target object.

3. The learning apparatus according to claim 1, wherein detection results of the target object by the plurality of detection units are a position and a size of the target object in the image, likelihood of the target object, and a pose of the target object.

4. The learning apparatus according to claim 1, wherein the target object is a person, and the state of the target object includes at least one of information indicating a size of the person and information indicating a size of a head of the person.

5. The learning apparatus according to claim 1,
wherein the state of the target object includes at least one of information indicating a size of the target object, information indicating a degree to which the target object does not fit within the image, information indicating a degree to which the target object is occluded, and information indicating a pose of the target object.

6. A detection apparatus that detects a target object in an input image, the detection apparatus comprising:
a plurality of first detection units configured to detect a part or whole of a target object from a plurality of learning images in each of which an actual state of the target object is known;
a first estimation unit configured to estimate a state of the target object detected by the plurality of detection units;
a classification unit configured to classify the learning images into a plurality of state classes based on the estimated state of the target object;
a calculation unit configured to calculate an error rate of the estimated state of the target object for each of the state classes with respect to each of the plurality of detection units based on the actual state of the target object;
a weight determination unit configured to determine a weight with respect to each of the plurality of detection units for each of the state classes based on the calculated error rate;
a storage unit configured to store respective weights for the plurality of detection units in association with the state classes of the target object;
a plurality of second detection units configured to detect a part or whole of the target object from the input image;
a second estimation unit configured to estimate a state of the target object detected by the plurality of second detection units;
a weight reference unit configured to refer to the respective weights for the plurality of detection units in the storage unit, based on the estimated state of the target object in the input image; and
a result output unit configured to output a final detection result of the target object based on a plurality of detection results output by the plurality of second detection units with respect to the input image and the respective weights referred to by the weight reference unit.

7. The detection apparatus according to claim 6,
wherein the weight reference unit interpolates values of the weight as continuous values, thereby obtaining a value of the weight suitable for the state of the target object in the input image.

8. A method for controlling a learning apparatus, comprising:
using at least one processor to perform the steps of:
detecting a part or whole of a target object a plurality of times from a plurality of learning images in each of which an actual state of the target object is known;
estimating a state of the target object detected by the plurality of times of detection;
classifying the learning images into a plurality of state classes based on the estimated state of the target object; and
calculating an error rate of the estimated state of the target object for each of the state classes with respect to each of the plurality of times of detection based on the actual state of the target object;
determining a weight with respect to each of the plurality of times of detection for each of the state classes, based on the calculated error rate; and
storing respective weights for the plurality of times of detection in association with the state classes of the target object.

9. A method for controlling a detection apparatus that detects a target object in an input image, the method comprising the steps of:
detect a part or whole of a target object a plurality of times from a plurality of learning images in each of which an actual state of the target object is known;
estimating a state of the target object detected by the plurality of times of detection;
classifying the learning images into a plurality of state classes based on the estimated state of the target object;
calculate an error rate of the estimated state of the target object for each of the state classes with respect to each of the plurality of times of detection based on the actual state of the target object;
determining a weight with respect to each of the plurality of times of detection for each of the state classes based on the calculated error rate;
storing respective weights for the plurality of times of detection in association with the state classes of the target object;
detecting a part or whole of the target object a second plurality of times from the input image;
estimating a state of the target object detected by the second plurality of times of detection;
referring to the respective weights for the plurality of times of detection stored in the storage step, based on the estimated state of the target object in the input image; and
outputting a final detection result of the target object based on the plurality of detection results output by the second plurality of times of detection with respect to the input image and the respective weights referred to by the weight reference step.

10. A non-transitory computer-readable storage medium storing a computer program for causing a computer to execute the steps of a method, the method comprising:
detect a part or whole of a target object a plurality of times from a plurality of learning images in each of which an actual state of the target object is known;
estimating a state of the target object detected by the plurality of times of detection;
classifying the learning images into a plurality of state classes based on the estimated state of the target object;
calculate an error rate of the estimated state of the target object for each of the state classes with respect to each of the plurality of times of detection based on the actual state of the target object;
determining a weight with respect to each of the plurality of times of detection for each of the state classes based on the calculated error rate;
storing respective weights for the plurality of times of detection in association with the state classes of the target object.

11. A non-transitory computer-readable storage medium storing a computer program for causing a computer to execute the steps of a method, the method comprising:
detect a part or whole of a target object a plurality of times from a plurality of learning images in each of which an actual state of the target object is known;
estimating a state of the target object detected by the plurality of times of detection;
classifying the learning images into a plurality of state classes based on the estimated state of the target object;

calculate an error rate of the estimated state of the target object for each of the state classes with respect to each of the plurality of times of detection based on the actual state of the target object;

determining a weight with respect to each of the plurality of times of detection for each of the state classes based on the calculated error rate;

storing respective weights for the plurality of times of detection in association with the state classes of the target object;

detecting a part or whole of the target object a second plurality of times from an input image;

estimating a state of the target object detected by the second plurality of times of detection;

referring to the respective weights for the plurality of times of detection stored in the storage step, based on the estimated state of the target object in the input image; and outputting a final detection result of the target object based on the plurality of detection results output by the second plurality of times of detection with respect to the input image and the respective weights referred to by the weight reference step.

* * * * *